Mar. 13, 1923.
J. M. AHLGREN
MEANS FOR SEALING STORAGE BATTERIES
Filed May 28, 1921
1,448,247
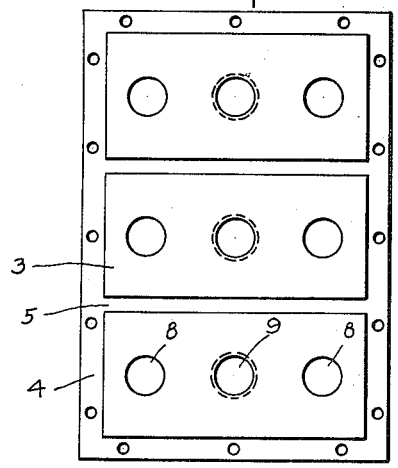
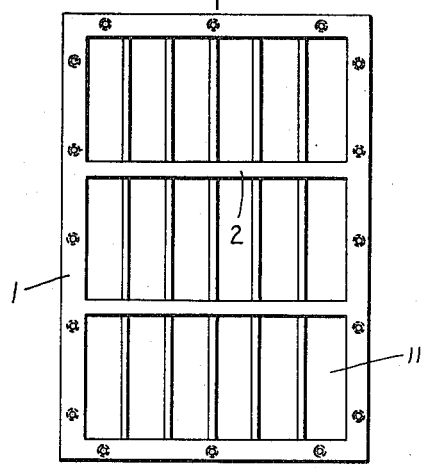
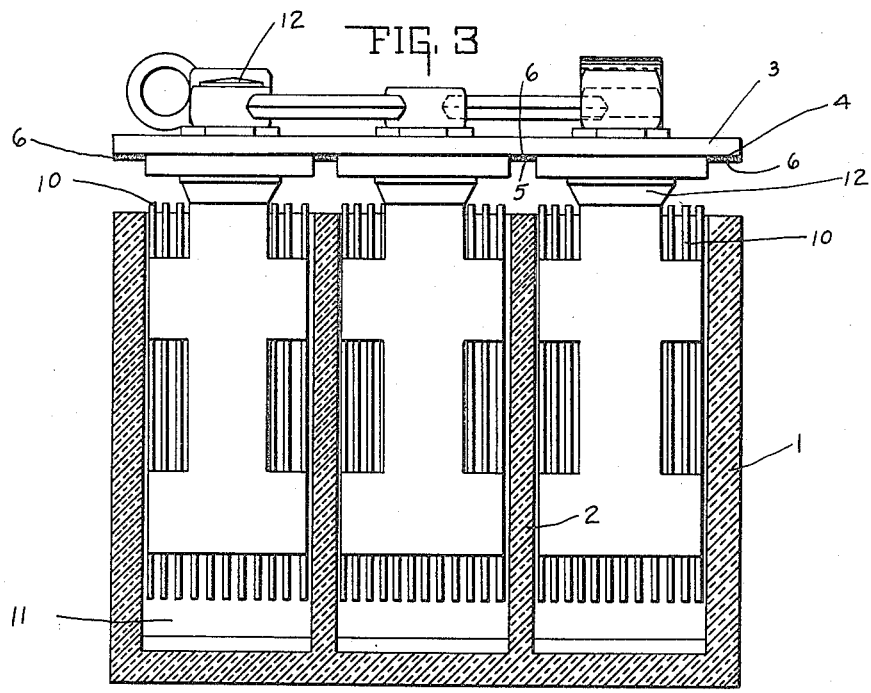
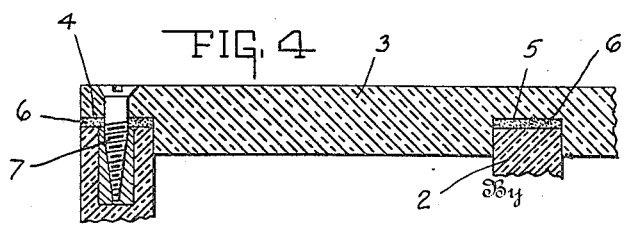
Inventor
JOHN M. AHLGREN
Attorney Patented Mar. 13, 1923.

1,448,247

UNITED STATES PATENT OFFICE.

JOHN M. AHLGREN, OF INDIANAPOLIS, INDIANA, ASSIGNOR TO AHLBELL BATTERY CONTAINER CORPORATION, OF CHICAGO, ILLINOIS, A CORPORATION OF ILLINOIS.

MEANS FOR SEALING STORAGE BATTERIES.

Application filed May 28, 1921. Serial No. 473,233.

*To all whom it may concern:*

Be it known that I, JOHN M. AHLGREN, a citizen of the United States, residing at Indianapolis, in the county of Marion and State of Indiana, have invented certain new and useful Improvements in Means for Sealing Storage Batteries, of which the following is a specification.

This invention relates to means for sealing storage batteries, the prime feature of the invention being the provision of channels or depressions in the under face of the cover for the battery container for engagement with the edges of the container and the divisional walls therein whereby a tight fitting joint between these parts will be produced.

A further feature of the invention is the provision of a sealing means which is introduced in said recesses and engages the top edges of the container for forming a seal tight joint.

A further feature of the invention is the provision of a cover which extends over the top edges of the container and having its edges flush with the outer faces of the container, said cover having openings therethrough for receiving the plate terminals of the battery through openings formed therein so that when the cover is removed the plates will be carried therewith.

Other objects and advantages will be hereinafter more fully set forth and pointed out in the accompanying specification.

In the accompanying drawings,

Figure 1 is a top plan view of a container or battery showing the cover removed therefrom, Figure 2 is a bottom plan view of the cover for the battery, Figure 3 is an elevation of a storage battery showing one face of the battery box removed and the cover and plates in partially elevated position above the box, and Figure 4 is an enlarged detail section through a portion of the battery box and cover.

Referring to the drawings, 1 indicates the container which is preferably constructed of fibrous material and having partitions 2 therein for dividing the interior of the container into compartments. Great difficulty is experienced in getting a battery which will properly hold the electrolyte and prevent leakage, the majority of the batteries requiring a covering over which is placed a sealing compound thereby rendering it expensive to manufacture as well as rendering it difficult to open the container to gain access to the interior thereof.

To overcome these objectionable features, a cover 3 is provided of any suitable material in the under face of which are formed depressions 4 for engagement with the edges of the side and end walls of the container, said cover also having recesses 5 which receive the upper edges of the partitions 2. In order to form a liquid tight union between the cover and the edges of the container, a sealing medium is introduced over the upper edges of the walls of the container and the partitions 2, said sealing medium entering the depressions 4 and recesses 5 when the cover is placed over the container. Screws 7, or the like, are provided for securing the cover to the container, the openings receiving said screws having the usual non-corrosive bushings therein. The cover 3 is also provided with terminal openings 8 and vent openings 9, these openings being arranged in the usual or any preferred manner.

As is usual a plurality of plates 10 are entered in the pockets 11 formed by the walls of the container and the partitions, each set of plates having a common terminal 12 which enters through the openings 8 in the cover and are secured thereto in any suitable manner. As all of the plates of each set are secured to their respective terminals all of the sets of the terminals will be raised out of the container 1 when the cover 3 is removed from over the container.

In this construction it will be readily seen that when the cover is placed over the container 1, and properly secured thereto by the screws 7, liquid tight joints will be provided over the upper end of the container and the partitions therein, the sealing medium being more or less yielding, and preferably adhering to the parts and serving to make a perfect union between the cover and the parts engaged thereby.

Having thus fully described my said invention, what I claim as new and desire to secure by Letters Patent, is:

Means for sealing storage batteries comprising the combination with a container having partitions therein, of a cover having depressions and recesses in the under face thereof for the reception of the upper edges of the walls of the container and said partitions, the solid portions of said cover between said depressions and recesses being of a uniform thickness throughout with said solid portions entering a distance into the upper end of said container between the walls and partitions thereof, the outer edges of said cover being flush with the outer faces of said container, a sealing medium entered in said depressions and recesses, and screws passing through said cover at the transverse center of the depressions and sealing means therein and into the side and end walls of the container for locking the cover in position over the container.

In witness whereof, I have hereunto set my hand and seal at Indianapolis, Indiana, this 25th day of May, A. D. nineteen hundred and twenty-one.

JOHN M. AHLGREN. [L. S.]

Witnesses:
 CAREY S. FRYE,
 M. L. SHULER.